(12) United States Patent
Hitchens et al.

(10) Patent No.: US 12,032,074 B2
(45) Date of Patent: Jul. 9, 2024

(54) TRACKING DEVICE

(71) Applicant: First Dragon Development Limited, Kowloon (HK)

(72) Inventors: Kenneth Hitchens, Kowloon (HK); William Harold Pike, II, Kowloon (HK); Christane Machado, Kowloon (HK)

(73) Assignee: First Dragon Development Limited, Kowloon (HK)

( * ) Notice: Subject to any disclaimer, the term of this patent is extended or adjusted under 35 U.S.C. 154(b) by 671 days.

(21) Appl. No.: 17/266,709

(22) PCT Filed: Aug. 7, 2019

(86) PCT No.: PCT/CN2019/099596
§ 371 (c)(1),
(2) Date: Feb. 8, 2021

(87) PCT Pub. No.: WO2020/029999
PCT Pub. Date: Feb. 13, 2020

(65) Prior Publication Data
US 2021/0311204 A1    Oct. 7, 2021

(30) Foreign Application Priority Data

Aug. 7, 2018 (HK) ................. 18110150.5

(51) Int. Cl.
*G01S 5/00* (2006.01)
*G01S 19/35* (2010.01)
(Continued)

(52) U.S. Cl.
CPC ............ *G01S 19/35* (2013.01); *G01S 5/0027* (2013.01); *G06Q 10/0833* (2013.01); *G01S 19/16* (2013.01); *G01S 2205/002* (2013.01)

(58) Field of Classification Search
CPC ........ G01S 5/0027; G01S 19/35; G01S 19/16; G01S 2205/002; G06Q 10/0833
(Continued)

(56) References Cited

U.S. PATENT DOCUMENTS

2001/0026240 A1    10/2001  Neher
2005/0212671 A1    9/2005   Auerbach et al.
(Continued)

FOREIGN PATENT DOCUMENTS

CN    1883132     12/2006
CN    101855142   10/2010
(Continued)

OTHER PUBLICATIONS

EP Search Report related filing.
HK Search Report related filing.

*Primary Examiner* — Ted M Wang
(74) *Attorney, Agent, or Firm* — Renner, Kenner, Greive, Bobak, Taylor & Weber

(57) ABSTRACT

A tracking device includes a location module arranged to determine a location of the tracking device; a communication gateway arranged to communicate the location of the tracking device to a receiver station; and a housing arranged to house the location module and the communication gateway, wherein the housing is further arranged to engage with an access mechanism such that when the access mechanism is actuated, the housing is manipulated.

26 Claims, 11 Drawing Sheets

(51) Int. Cl.
*G06Q 10/0833* (2023.01)
*G01S 19/16* (2010.01)

(58) Field of Classification Search
USPC ..................................................... 455/456.1
See application file for complete search history.

(56) References Cited

U.S. PATENT DOCUMENTS

| | | |
|---|---|---|
| 2008/0186163 A1 | 8/2008 | Mills |
| 2009/0072554 A1* | 3/2009 | Arguin .................. G09F 3/0329 |
| | | 292/327 |
| 2009/0322510 A1* | 12/2009 | Berger .................. H04W 60/00 |
| | | 340/568.1 |
| 2013/0321122 A1 | 12/2013 | Lee et al. |
| 2014/0184804 A1 | 7/2014 | Lee et al. |

FOREIGN PATENT DOCUMENTS

| | | |
|---|---|---|
| CN | 201917935 | 8/2011 |
| CN | 102822879 | 12/2012 |
| CN | 203199469 | 9/2013 |
| CN | 103593807 | 2/2014 |
| CN | 204081715 | 1/2015 |
| CN | 103703500 | 3/2017 |

\* cited by examiner

TRACKING DEVICE

TECHNICAL FIELD

The present invention relates to a tracking device, and particularly, although not exclusively, to a tracking device arranged to engage with a container to determine a location and the manipulation status of the container.

BACKGROUND

Global trading has been a common activity for centuries and companies have heavily relied on "Full Container Load" (FCL), "Less than Container Load" (LCL), or air shipment to send goods locally or overseas. In the past, FCL is the standard form of shipping method and the entire container in various sizes is rented for exclusive use by shipping companies. This is fine as containers are often locked and accessible to very few parties such as shipping agents, docking agents and Customs officials.

However, as online retail shopping has become more popular, LCL offers shippers with smaller shipments without shippers having to rent out the entire container if they only have small amount of freights to ship. Air shipment of container with customised size has also become a welcomed choice for shippers where the budget of freights is not of their concern. However, online shopping has caused two concerns, the first is that the value of the goods that are shipped can vary significantly, from low cost items to high cost items and thus increasing the risk of loss from theft whilst the second is that with many LCL containers being more suited to online retailers, access to the LCL container will increase, in turn meaning the container may be breached and accessed more regularly in different locations, further increasing the security risk.

SUMMARY OF THE INVENTION

In accordance with a first aspect of the present invention, there is provided a tracking device comprising a location module arranged to determine a location of the tracking device; a communication gateway arranged to communicate the location of the tracking device to a receiver station; and a housing arranged to house the location module and the communication gateway, wherein the housing is further arranged to engage with an access mechanism such that when the access mechanism is actuated, the housing is manipulated.

In an embodiment of the first aspect, when the housing is manipulated, the manipulation is detected and recorded by a processor as a manipulation event.

In an embodiment of the first aspect, the manipulation event is processed to include the location of the tracking device at the time of the manipulation.

In an embodiment of the first aspect, the manipulation event is communicated to the receiver station via the communication gateway.

In an embodiment of the first aspect, the housing is elongated and is arranged to engage with an access mechanism by insertion into a locking aperture of the access mechanism.

In an embodiment of the first aspect, the housing includes a shoulder portion arranged to abut the locking aperture so as to retain the housing in the locking aperture.

In an embodiment of the first aspect, the housing further includes a locking cap arranged to engage with a distal end of the shoulder portion so as to secure the housing in the locking aperture.

In an embodiment of the first aspect, the locking cap includes a receiving slot arranged to receive and engage to a protruding tooth on the housing.

In an embodiment of the first aspect, when the locking cap is engaged or disengaged from the housing, the processor is arranged to detect the engagement and disengagement of the locking cap.

In an embodiment of the first aspect, the engagement and disengagement of the locking cap is stored and processed as an engagement and disengagement event.

In an embodiment of the first aspect, the engagement and disengagement event is processed to include the location of the tracking device at the time of the engagement or disengagement.

In an embodiment of the first aspect, the locking cap is attached to the housing before use and is arranged to be detached from the housing by a user to engage with the distal end of the shoulder portion for use of the tracking device.

In an embodiment of the first aspect, the locking cap is integrally formed as part of the housing and includes a breakable attachment arranged to attach the cap to the housing.

In an embodiment of the first aspect, when the breakable attachment is broken, a wake up signal arranged to switch on the processor, communicate gateway or location module is generated.

In an embodiment of the first aspect, the breakable attachment includes an electrical conduit arranged to actuate a circuit to generate the wake up signal when the electrical conduit is manipulated when the breakable attachment is broken.

In an embodiment of the first aspect, the housing includes an elongated portion and the elongated portion in use is at least partially inserted into the locking cap.

In an embodiment of the first aspect, the shoulder portion is arranged to engage with the elongated portion.

In an embodiment of the first aspect, the shoulder portion is fastened to the elongated portion.

In an embodiment of the first aspect, the elongated portion includes an elongated fastener for locking the shoulder portion to the elongated portion.

In an embodiment of the first aspect, the shoulder portion is removable from the protruding tooth upon the upper and lower portions of the elongated portion are separated into two pieces.

In an embodiment of the first aspect, the elongated portion further includes a circuited wire for generating a signal indicating a separation of the upper and lower portions.

In an embodiment of the first aspect, the location of the tracking device communicated to the receiver station is compared with a user predetermined location of the tracking device for validating the manipulation of the housing.

In an embodiment of the first aspect, the tracking device further includes an antenna module through which the location module determines the location of the tracking device with respect to a GPS source.

In an embodiment of the first aspect, the tracking device further includes a solar panel for absorbing solar energy and converting the absorbed solar energy for the power supply of the tracking device.

In an embodiment of the first aspect, the damages to the breakable attachment between the housing and the locking cap by a breaking act to the breakable attachment is irreversible.

In an embodiment of the first aspect, the previous location of the tracking device and the previous manipulation event of the housing associated with an aforesaid access mechanism is erased from the tracking device prior to engaging the housing with another access mechanism.

In an embodiment of the first aspect, individual data associated with the location of the tracking device and the manipulation event of the housing is capsulated in a blockchain, whereby the new data associated with the new location of the tracking device and the new manipulation event is stored within the blockchain.

In an embodiment of the first aspect, the tracking device is arranged to operate in a battery saving mode if the communication between the communication gateway and the receiver station is terminated for a predetermined period.

In an embodiment of the first aspect, the tracking device is arranged to communicate with one or more adjacent tracking devices for forming a data exchanging network whereby data received by one tracking device from a data source is communicated to other tracking devices via the data exchanging network.

In an embodiment of the first aspect, further includes a radio frequency (RF) sensor for sensing the radio frequency of an object proximate to the tracking device.

In an embodiment of the first aspect, further includes an environmental sensor for monitoring one or more environment conditions about the tracking device.

In an embodiment of the first aspect, further includes a motion sensor for sensing a movement associated with the tracking device.

In an embodiment of the first aspect, the locking cap attached to the housing during use is removable from the housing, whereby the locking cap is capable of being reattached to the housing for tracking repeated access.

In an embodiment of the first aspect, the locking cap attached to the housing during use is not removable from the housing.

In an embodiment of the first aspect, the locking cap is removed upon the elongated portion being cut.

Preferably, the elongated portion is cut by use of a bolt cutter.

It is an advantage of some example embodiments of the present invention to address the above needs, to overcome or substantially ameliorate the above disadvantages or, more generally, to provide a new or otherwise improved tracking device.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
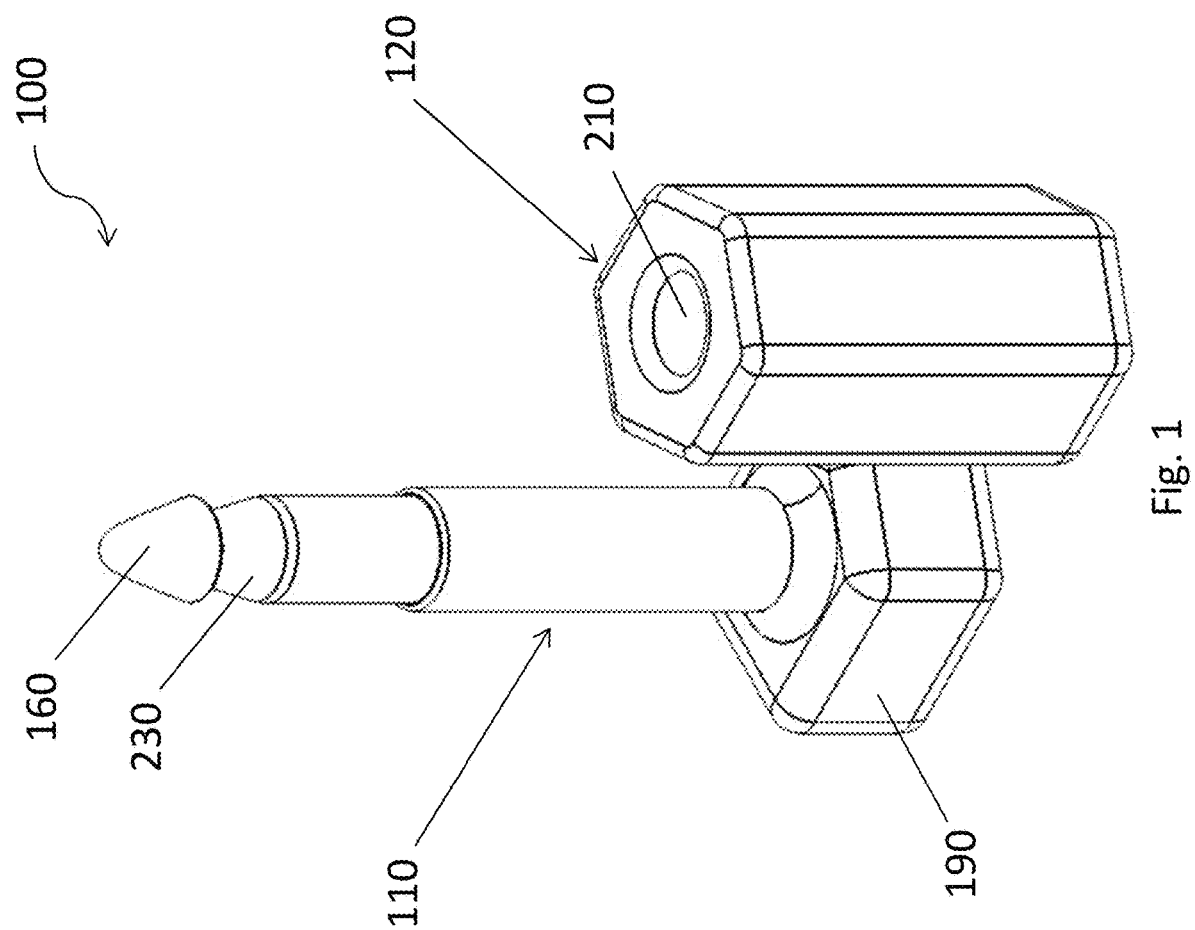
FIG. 1 shows a perspective view of a tracking device with a housing and a locking cap in accordance with one embodiment of the present invention.

Without wishing to be bound by theory, the inventors of the present application have devised through their own researches and trial experiments that once goods are consigned to a shipping company, the consigner automatically loses the ability to keep track of the status of the goods. The status includes but is not exhausted by the followings: the location of the shipment, time and the whereabouts the container is sealed or unlocked. This type of information becomes extremely valuable when the shipment is delayed, lost or the goods are found spoiled or mixed with other illegal substance in the absence of knowledge of the consignor and/or consignee.

Accordingly, a location tracking system which carries the ability to tell the location and time when the container is locked and opened is critical in determining the legal liability.

The present invention seeks to provide a device which may help to determine legal liability over and above the basic tracking and tracing as well as other uses over conventional tracking devices, thereby solving or at least alleviating one or more of the aforementioned problems.

In the present invention, the concerned tracking device described herein may be suitable for, but is not limited to, three general product categories, including: 1) real-time tracking of a FCL shipment, 2) real-time tracking of a LCL shipment shipped by sea inside a container, and 3) real-time tracking of an air shipment. The tracking device is suitable for different types and sizes of containers.

Referring to FIGS. 1 to 11, there is shown a tracking device 100 comprising a location module 130 arranged to determine a location of the tracking device 100; a communication gateway 140 arranged to communicate the location of the tracking device 100 to a receiver station 150; and a housing 110 arranged to house the location module 130 and the communication gateway 140, wherein the housing 110 is further arranged to engage with an access mechanism such that when the access mechanism is actuated, the housing 110 is manipulated.

Figure 2:
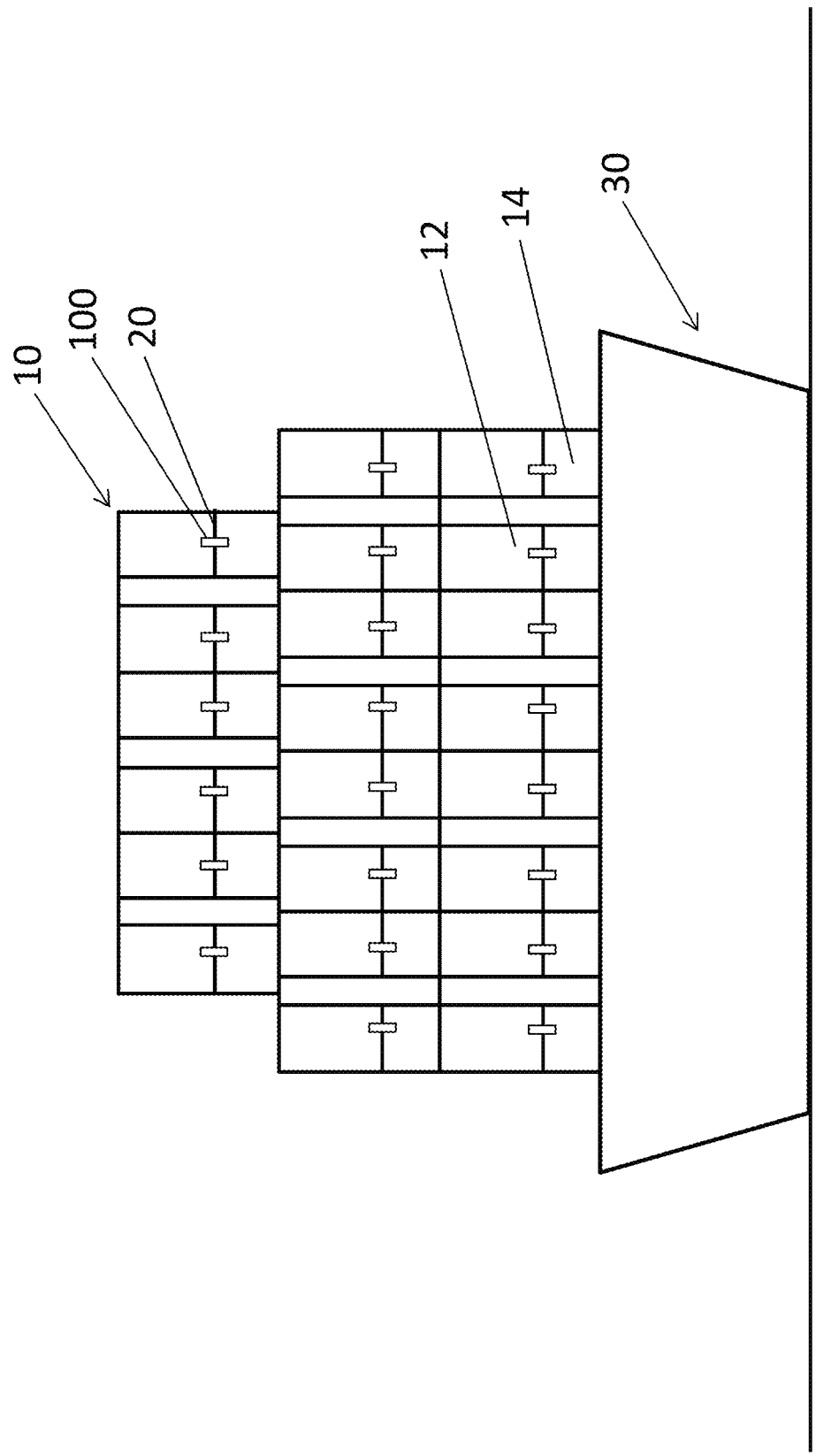
FIG. 2 shows a schematic diagram illustrating a container ship with a plurality of containers each locked by the tracking device of FIG. 1.

In one example container ship 30 as depicted in FIG. 2, there is provided a container 10 for storing items, including personal items, goods and valuable items and an access mechanism 20 for accessing the content therein e.g. a handle, a lever, a retainer catch etc. For the interest of security, the access mechanism 20 may be provided additionally or incorporated as a locking mechanism on a door or access portal for restricting the access thereto only by permitted or licensed users. For instance, the access mechanism 20 of the container 10 may include an aperture on its doors 12, 14 through which the tracking device 100 e.g. bolt may be inserted or mounted thereto and in turn must be removed or otherwise manipulated such that the access mechanism 20 can be manipulated for access to the container 10, thereby assuring that if one without permission did attempt to access the container 10 through the access mechanism 20, the person in charge may be alerted immediately and take necessary actions as the tracking device 100 would have been manipulated and have detected and transmitted a signal to represent the manipulation.

FIG. 1 illustrates an example embodiment of a tracking device 100 having at least two major mechanical components. In this instance, the tracking device 100 includes a housing 110, a locking cap 120 to which a portion of the housing 110 may be selectively engaged or disengaged by the operator, a movement sensor 160 e.g. gyro sensor for detecting such engagement or disengagement, and a battery module for providing power supply to the movement sensor 160 and all other electronic components. The engagement between the housing 110 and the locking cap 120 is monitored by the tracking device 100. In particular, the engagement status between the housing 110 and the locking cap 120 may be detected and recorded by tracking device 100 as a manipulation event, and in turn the recorded manipulation event may be utilised for further data analysis or other usages.

Figure 3:
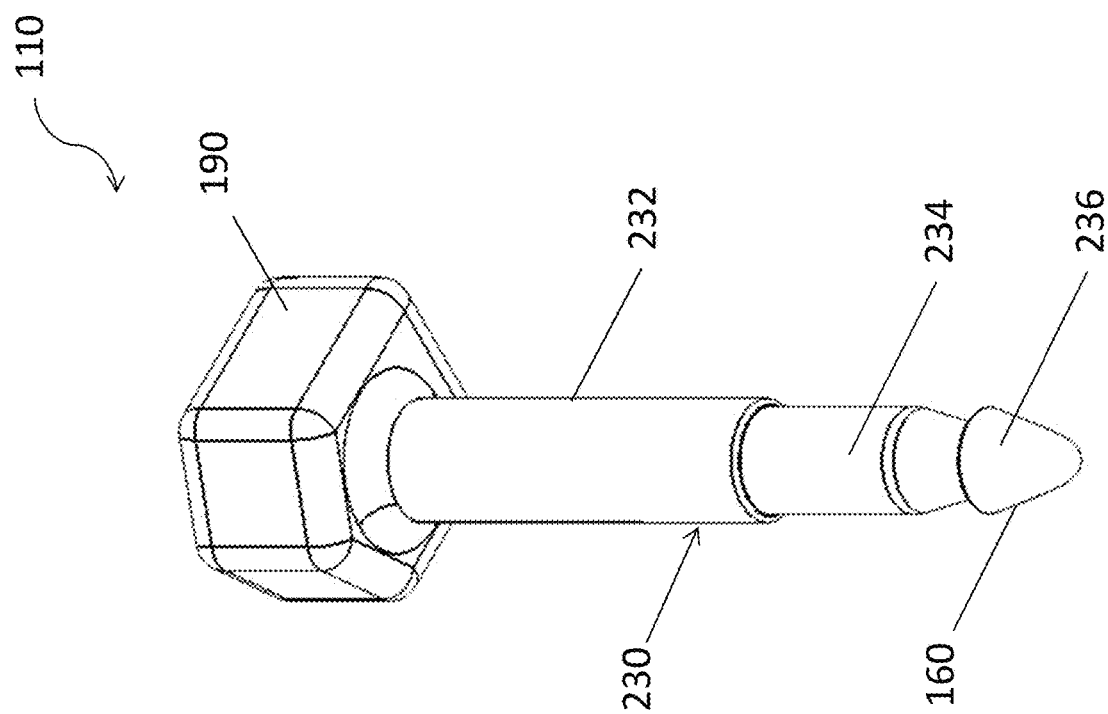
FIG. 3 shows a perspective view of the housing of the tracking device of FIG. 1.
Figure 4:
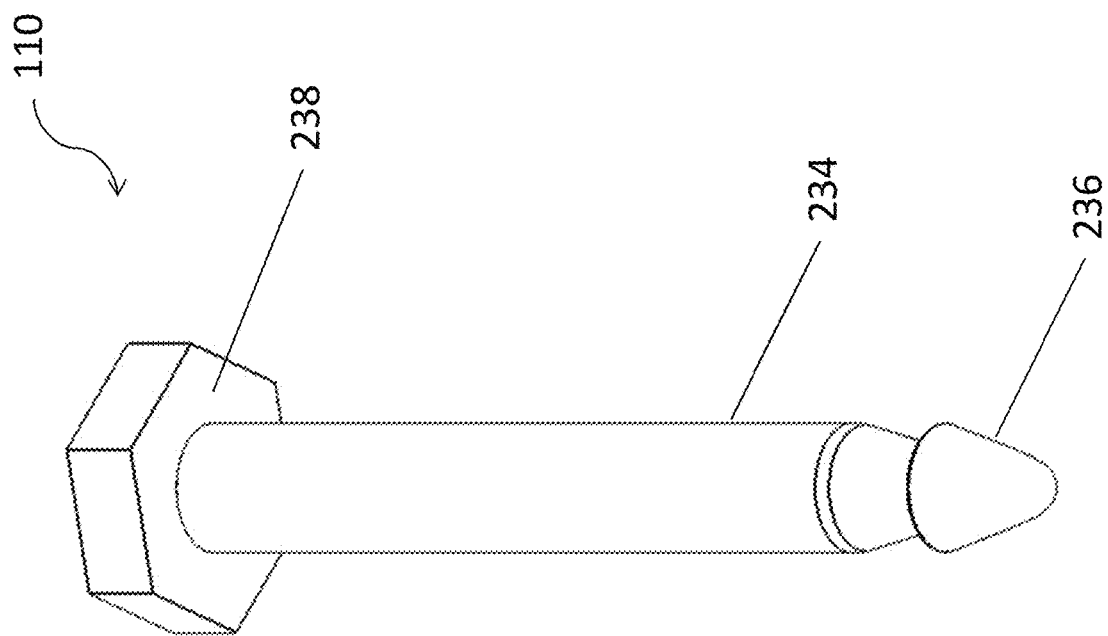
FIG. 4 shows a partial view of a protruding tooth of the tracking device of FIG. 3.

Referring now to FIGS. 3 to 4, there is illustrated the detailed physical construction of the housing 110. The housing 110 includes a bulbous portion on one end forming a shoulder portion 190 and an elongated, cylindrical portion extruding from the other end of the housing 110 underneath the shoulder portion 190 forming a male member 230 e.g. a tube or a protruding tooth. The shoulder portion 190 and the protruding tooth 230 may be made of different materials. For instance, the shoulder portion 190 may be made of hard plastic e.g., thermosetting plastic and on the other hand, the protruding tooth 230 may be made of metal.

The protruding tooth 230 may further include an intermediate portion 232 e.g. a plastic sleeve and a lower tip portion 234 with a reduced cross-sectional area. On the other hand, the locking cap 120 may include a female member 210 e.g. a cylindrical receiving slot 210 through which the protruding tooth 230 may be received therein, thereby engaging the housing 110 with the locking cap 120.

Figure 5:
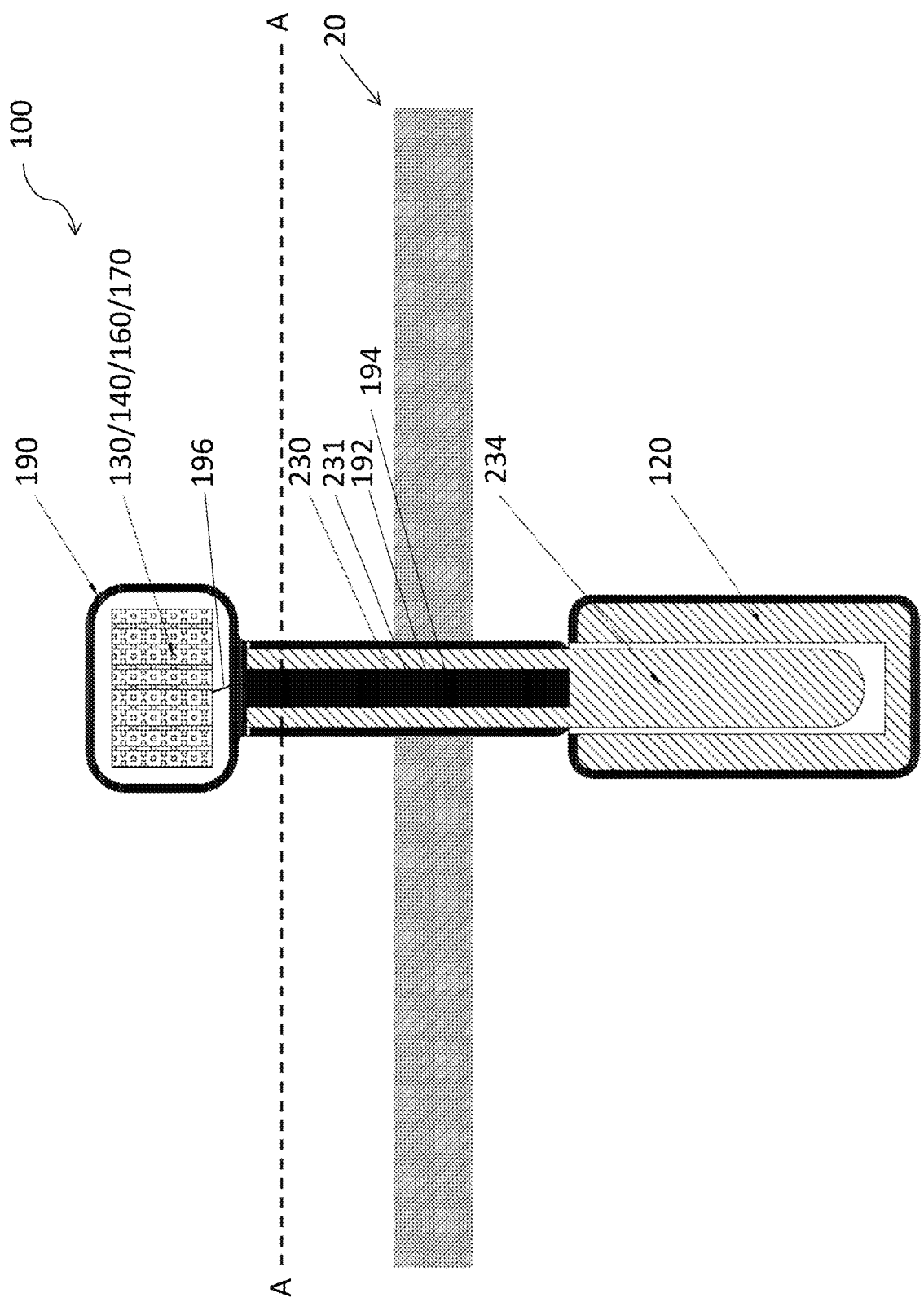
FIG. 5 shows a cross-sectional view of the tracking device of FIG. 1, illustrating the engagement between the shoulder portion and the locking cap.

Referring now to FIG. 5, the shoulder portion 190 of the housing 110 may include an elongated tail portion 192 incorporating an elongated fastener e.g. a hook 194 and a circuited wire 196 connecting from an output of the processor 170 to an input of the processor 170 positioned along the axial direction of the tail portion 192. The protruding tooth 230, on its upper end, includes a slot for receiving the hook 194 and the tail portion 192 therein and along its longitudinal axis, includes an inner sidewall 231 on the slot for engaging the tail portion 192, and in turn, surrounds the tail portion 192 longitudinally. Accordingly, the shoulder portion 190 may be locked by the tail portion 192 by means of the interaction between the hook 194 and slot.

To remove the tracking device 100 from the access mechanism 20 of the container 10, the protruding tooth 230, as well as the received tail portion 192, are cut by a bolt cutter across the cross-sectional area of the protruding tooth 230 e.g. along the cross-sectional line AA as depicted, thereby separating the upper and lower portions of the tail portion 192 into two pieces. At this occasion, the tail portion 192 of the shoulder portion 190 is no longer retained by the protruding tooth 230 via the hook 194. Preferably, during the cutting operation, the wire 196 is also cut by the bolt cutter and emits a signal, indicating that the tracking device 100 has been cut by the operator, to the processor 170.

In one example embodiment, the tip portion 234 of the protruding tooth 230 may be constructed with an upper hexagonal disk 238 for encapsulating within the lower shoulder portion 190, such that the protruding tooth 230 may align with the shoulder portion 190 in a coaxial manner. Optionally, one or more of the components of the protruding tooth 230 might be embodied in different shapes. For instance, the upper disk 238 and the lower tip portion 234 may be embodied in other feasible shapes conducive to deliver the locking feature.

Figure 6:
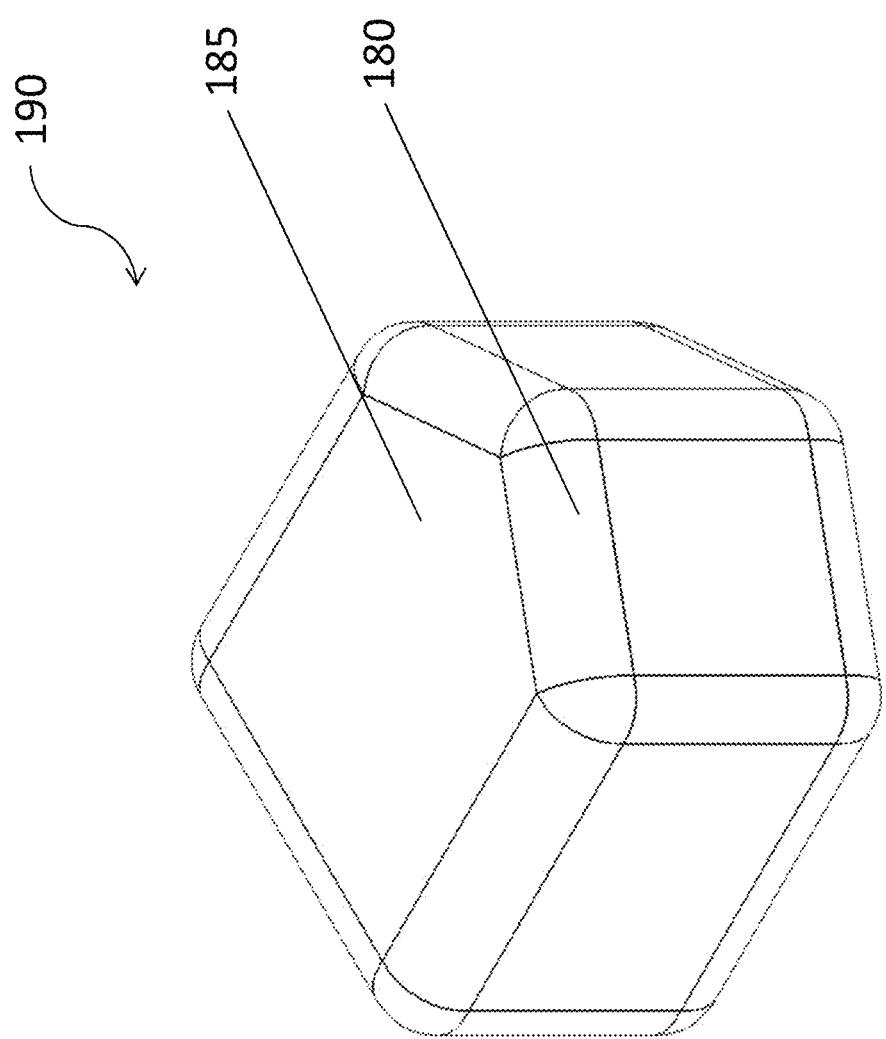
FIG. 6 shows a partial view of a shoulder portion of the tracking device of FIG. 3.

FIG. 6 illustrates only the shoulder portion 190 of the housing 110 which is constructed for example in pentagonal-box shape or any other shape and elongated from the pentagonal surface with all the edges chamfered. Upon engaging the housing 110 with the locking cap 120, the lower pentagonal surface may adjoin a retainer catch of a container. Therefore, the shoulder portion 190 must be dimensioned to have a greater cross-sectional area than the locking aperture of the retainer catch for sandwiching the retainer catch between the shoulder portion 190 and the locking cap 120.

Preferably, the shoulder portion 190 not only encapsulates the hexagonal base portion of the protruding tooth 230 as mentioned, but also contains other electrical modules therein. For instance, the shoulder portion 190 may provide a cavity for housing one or more of a location module 130, a communication gateway 140, a movement sensor 160, a processor 170, and a wireless communication module such as antenna 180.

Optionally, the shoulder portion 190 might be in a different shape as long as the base area of the shoulder portion 190 is sufficiently greater than the area of the locking aperture of a retainer catch. The aesthetics of the tracking device 100 may also be taken into considerations.

Figure 7:
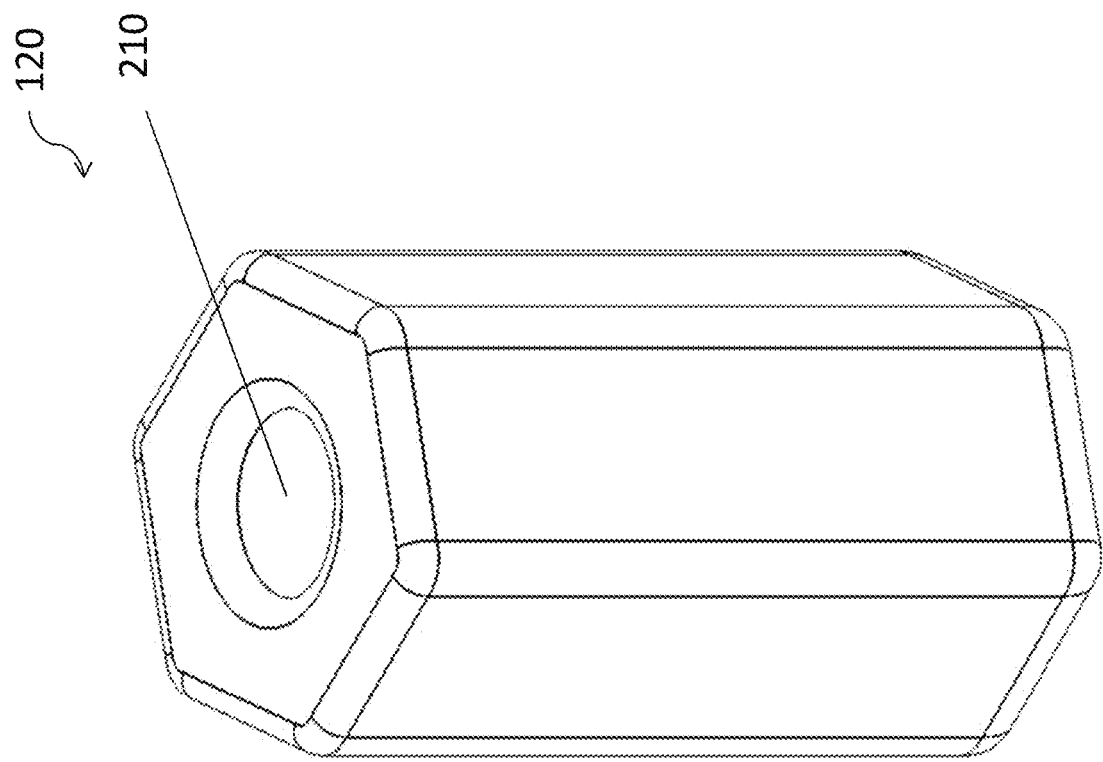
FIG. 7 shows a perspective view of the locking cap of the tracking device of FIG. 1.

Turning now to the detailed construction of the locking cap 120 as depicted in FIG. 7, the locking cap 120 may be constructed in hexagonal shape elongated from the hexagonal surface with all the edges chamfered. The locking cap 120 may also include a receiving slot 210 through which the protruding tooth 230 may be received therein, such that the housing 110 and the locking cap 120 are engaged in a coaxial manner. Optionally, the locking cap 120 might be embodied in a different shape as long as it can fit in all the necessary components and is able to secure the protruding tooth 230 in place.

Preferably, the locking cap 120 may further include a mechanical mechanism for locking and securing the protruding tooth 230 in place inside the receiving slot 210. In one example embodiment, the lower tip portion 234 of the protruding tooth 230 may further include a mushroom-shaped tip portion 236 and on the other hand, the receiving slot 210 may include a retainer catch (not shown) at its lowermost level for receiving the tip portion 236 in a tight manner. The cross-sectional area of the cylinder portion 230 is much smaller than that of the receiving slot 210 such that the operator may insert the tip portion 236 to the retainer catch without much effort. Furthermore, this allows the disengagement of the tip portion 236 from the retainer catch to be detected readily by the tracking device 100. Alternatively, the tip portion 236 might be embodied in other shapes as long as it is able to lock the tip portion 236 with the locking mechanism in the receiving slot 210 of the locking cap 120.

Advantageously, the engagement between the locking cap 120 and the housing 110 may be tailor made to suit various applications and fulfil different requirements. For instance, if the tracking device 100 is intended for a single-use application and required to provide each container 10 a unique identity in each turn of shipping, the locking cap 120 attached to the housing 110 during use is not removable from the housing 110. Even if the operator forcibly removes the locking cap 120 from the housing 110, the engagement between the locking cap 120 and the housing 110 would be permanently damaged or it may require the housing 110 and/or the locking cap 120 to be destroyed. The locking cap 120 may not be reattached to the same housing 110 or attached to another housing 110' for use.

In an alternative example embodiment, the tracking device 100 is suitable for repeated access. For instance, the locking cap 120 attached to the housing 110 during use may be removed from the housing 110 for temporary access and the locking cap 120, after the temporary access, is readily reattached to the same housing 110 or attached to another housing 110' without the need of repairing or maintenance.

The location of the container at which the manipulation event of the tracking device 100 is triggered may also be important to a user tracking the container. To determine the instant location of the tracking device 100 associated with the container, there is also provided a location module 130 preferably on the upper surface of the shoulder unit 190 for generating a signal associated with the location of the tracking device 100 and a built-in processor 170 for processing the signal generated by the location module 130.

In one example embodiment, the location module 130 may include a hardware system e.g. Global data SIM, SIM-less data (SIM features built into electronics or programed into a programmable storage module), direct satellite data connectivity, or other means which would enable the location module 130 to perform similar function. To support the hardware system, there is also provided a software system for the purpose. For instance, the location module 130 may utilize one or more of the following locational functions to assist the hardware system: 1) Global Positioning System (GPS)/Global Navigation Satellite System (GNSS); 2) cell tower triangulation; 3) Wi-Fi positioning system; or other locational technologies.

In one example embodiment, the location module 130 may determine the location of the tracking device 110 via GPS, which is a subset of GNSS. The location module 130 may determine the autonomous geo-spatial positioning of the tracking unit 110 based multiple satellites with global coverage. Advantageously, even if one of the multiple satellites fails, the location module 130 may detect the position of the tracking unit 110 by relying on the signal from other remaining and functioning satellites.

The advantages of placing the location module 130 on the upper surface of the shoulder portion 190, in that the GPS positioning of the location module 130 with respect to the GPS source may be more accurate. To ensure that the location module 130 is facing upwardly, the movement sensor 160 may record the orientation of the tracking device 100 and transmit the signal associated with the orientation of the tracking device 100 to the processor 170, such that the processor 170 may calibrate the GPS location of the tracking device determined by the location module, and in a worst scenario, notify the operator the misplacement of the tracking device 100 and the reliability of the GPS location.

In one alternative example embodiment, the location module 130 may determine the location of the tracking device 110 via cell tower triangulation. For instance, the cell tower triangulation may include a plurality of cell towers and preferably at least three cell towers each of which emitting signal within a coverage area. Based on the signals and magnitude emitted by the towers, the location module 130 may pinpoint the exact location of the tracking unit.

In one alternative example embodiment, the location module 130 may determine the location of the tracking device 110 via one or more Wi-Fi hotspots or wireless access points. For instance, the tracking device 110 may correlate the location module 130 with the unique SSID and MAC address of the Wi-Fi hotspot.

Preferably, the aforesaid movement sensor 160 may also be deployed to determine whether the tracking device 100 has been tampered by a third party during the operation of the tracking device 100. For instance, the motion sensor 160 may detect the angular movement of the tracking device 100. Preferably, the movement arise from the vibration of the carrier e.g. vehicle or shipping vessel during the logistic supply may be considered as noise and discarded by the motion sensor 160. This ensures that the movement sensor 160 would not erroneously alert the operator.

In addition, there may also be provided a telecommunication module 180, e.g. an antenna on the upper surface of the shoulder portion 190 extending from the location module 130, such that a higher precision of location signal may be detected by the location module 130 and in turn, any uncertainties or inaccuracy of the detected location may be prevented or at least minimised.

Optionally, the tracking device 100 may carry a solar panel 185 for providing additional power supply to the electrical modules. This solar panel 185 may be mounted on the upper surface of the shoulder portion 190 of the housing 110 or the surface of the locking cap 120 exposed to sunlight. For example, as depicted in FIG. 6, there is also provided a solar panel 185 on the shoulder portion 190 of the housing 110. This is particularly advantageous as the tracking device 100 may be required to operate for a prolonged period e.g. in a shipping arrangement. The solar panel 185 may serve as an auxiliary power supply to the tracking device 100 and thus, this ensures that the service of the tracking device 100 would not be interrupted in any events that the built-in battery of tracking device 100 completely dies out before the tracking device reaches the final destination.

To access, record and further process the location data and manipulation data obtained by the tracking device e.g. data associated with the location of the tracking device and the data associated with manipulation events and locations of the tracking device 100 when the device detects that there is a manipulation, the tracking device 100 further includes a communication gateway 140 arranged to communicate with a receiver station 150. As an example, the data transmitted by one or more communication modules such as location module 130 may be received by a receiver station 150 in a unidirectional or bidirectional manner or exchanged therebetween via one or more communication gateways 140 within the tracking device such as global 3G/4G/4G-IOT/5G or other future networks. In these examples, the location of the tracking device 100 communicated to the receiver station 150 which may in turn transmit this information to a central tracking server accessible by various users and interested parties to track the location of the shipment. Furthermore, manipulation events that are detected by the tracking device 100 may also be communicated via the gateway 140 to the server and in turn allow users and interested parties to determine when the container may have been accessed, including when the tracking device was placed on the container, when it is removed from the container, and whether there were any further actions in between the two events which would signal that the container would have been opened or breached. Along with the location information, this would be very helpful to track the status and security of the consignment.

Furthermore, in another example, the location data and manipulation data may be compared to a user predetermined location of the tracking device 100 i.e. the intended destination or the travel path of the container, thereby validating the expected manipulation of the housing 110. Should there be any deviation from this predetermined location and manipulation events, alarms and alerts can be raised to relevant users and parties to prevent further theft, loss or delays.

In some embodiments, the communication gateway 140 may be arranged to communicate with other tracking devices that may be placed in close proximity to each other, and thereby reducing power in transmitted information to a base station or, as is common in transport systems, even should a base station be installed, it may not be accessible for tracking devices that are out of range due to the size of the transport vessel or vehicle. In these examples, the communication gateway 140 may be arranged to relay messages from other tracking devices within its range so as to assist other tracking devices to communicate their data to a base station that may be out of range. Security and Quality of Service (QOS) concerns would, as the person skilled in the art would appreciate, have to be considered within this implementation.

Figure 8:
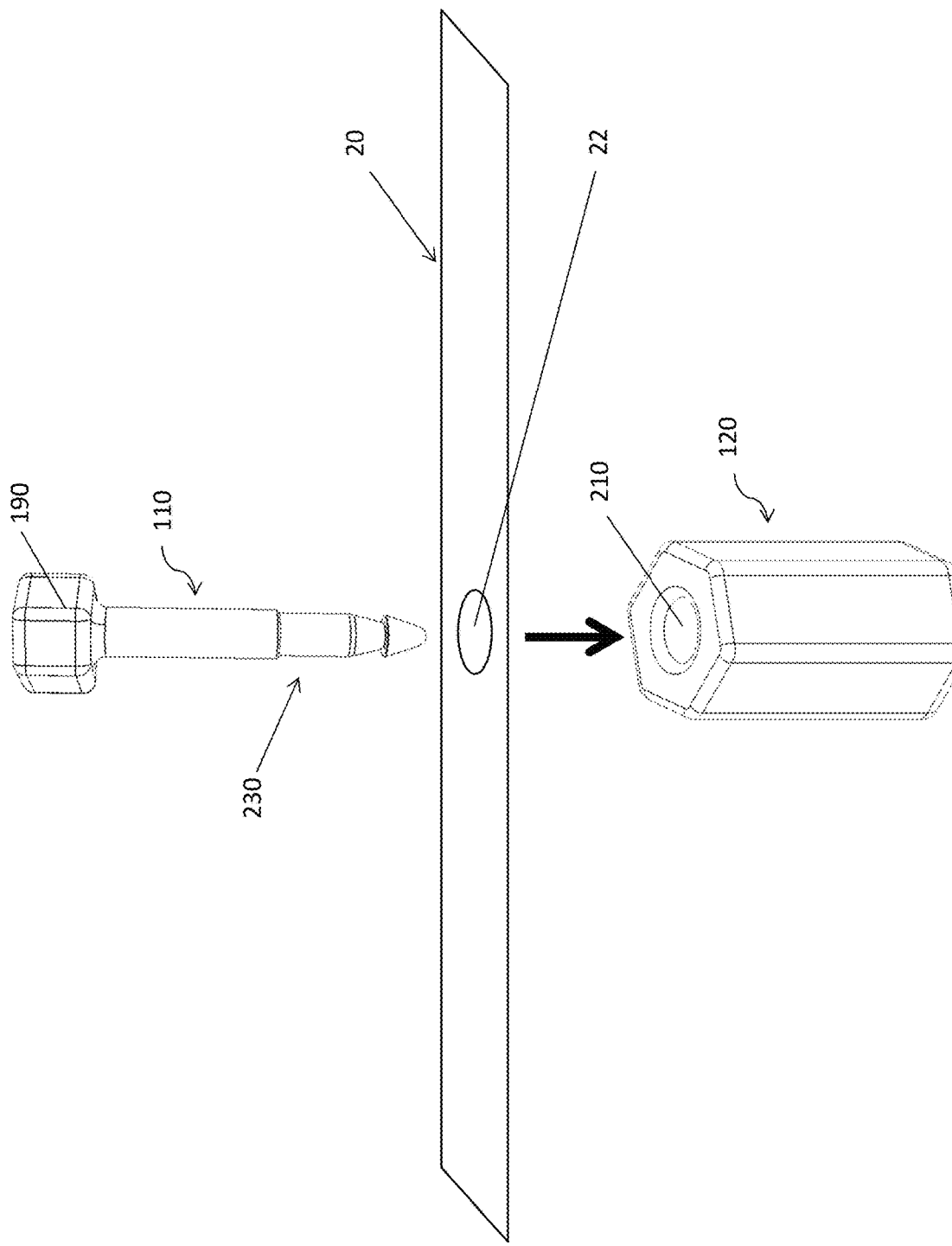
FIG. 8 shows a schematic diagram illustrating the application of the tracking device of FIG. 1 to an access mechanism of a container.

As shown in FIG. 8, the protruding tooth 230 of the housing 110 is aligned with and inserted along the direction as depicted into the receiving slot 210 of the locking cap 120 through a target object 20. The locking mechanism between the protruding tooth 230 of the housing 110 and the receiving slot 210 of the locking cap 120 would then lock each other in place. For example, if a user intends to use it, the user is required to insert the housing 110 through a locking aperture 22 of an access mechanism 20 associated with the concerned container into the receiving slot 210 of the locking cap 120. The tracking device 100 would notify the user that the housing 110 and the locking cap 120 are securely locked together by giving out a mechanical or electronic signal.

Advantageously, the same tracking device 100 may be used repetitively for monitoring the manipulation event of the access mechanism of different batches of shipping order. For instance, upon completion of a shipping order, the tracking device 100 may be disengaged from the access mechanism by the operator. The previous location of the tracking device 100 and the previous manipulation event of the housing 110 associated with the access mechanism of the previous container may be erased from the tracking device 110 for a reset. The housing 110 of the same tracking device 100, without the previous location data and manipulation event, may then be used to engage the access mechanism of another container for monitoring the manipulation event of the container in the next shipping order.

In one alternative example embodiment, the tracking device 100 may also deploy block chain technology to record each location or manipulation event. The location of the tracking device 100 and the manipulation event of the housing 110 may be stored in each block and the blockchain together may be encrypted and decrypted by same set or different set of public and private keys, or may be provided in the form of a public or private blockchain. For instance, the data associated with the location data of the tracking device 100 and the manipulation event of the housing 110 may be encrypted by a public key on one side before communicating the data to the receiver station 150. The other side with a private key may decrypt the encrypted information to retrieve the data associated with the location data of the tracking device 100 and the manipulation event of the housing 110. The application of blockchain is particularly advantageous, as each block is connected to all the blocks in the blockchain and this make it extremely difficult to alter the records of the location data and manipulation event in the block chain. This provides an information transmission system with high level of security whilst making it easily accessible to any persons to validate the quality, security and contents of the container as it is being transported around the world.

In one example embodiment, the manipulation event of one tracking device 100 and the location associated with the manipulation event may be transmitted to and stored in other adjacent tracking devices 100', 100" etc. For instance, when the ship is located in the middle of a large and empty Ocean and there is no reception for a predetermined period, a crew member may break one of the tracking devices 100 to open a corresponding container 10 in order to access the items stored therein. To capture these events, the tracking device 100, upon detecting the access wherein the access mechanism 20 of one container 10 is manipulated by the crew member, the device 100 may proceed to transmit this event with the remaining untouched tracking devices 100', 100" located proximate to the device 100. In turn, the manipulation event of the tracking device 100 may be stored in the remaining tracking devices 100', 100". Although the manipulation event is not yet transmitted to any servers or remote computers, evidence of such event may be stored in other tracking devices 100', 100" and it is unlikely that the crew member may destruct all the tracking devices 100', 100" on the ship to destroy such evidence. For instance, when the ship sails across the ocean and reaches a region with reception or arrives the port, the manipulation event associated with the broken tracking device 100 may be transmitted to the receiver station 150 by one or more of the remaining tracking devices 100', 100". Thus, although the manipulation event took place outside of an ocean with reception, the timing, access, and location of the manipulation is nonetheless known as it is retained by the other device 100', 100".

Figure 9:
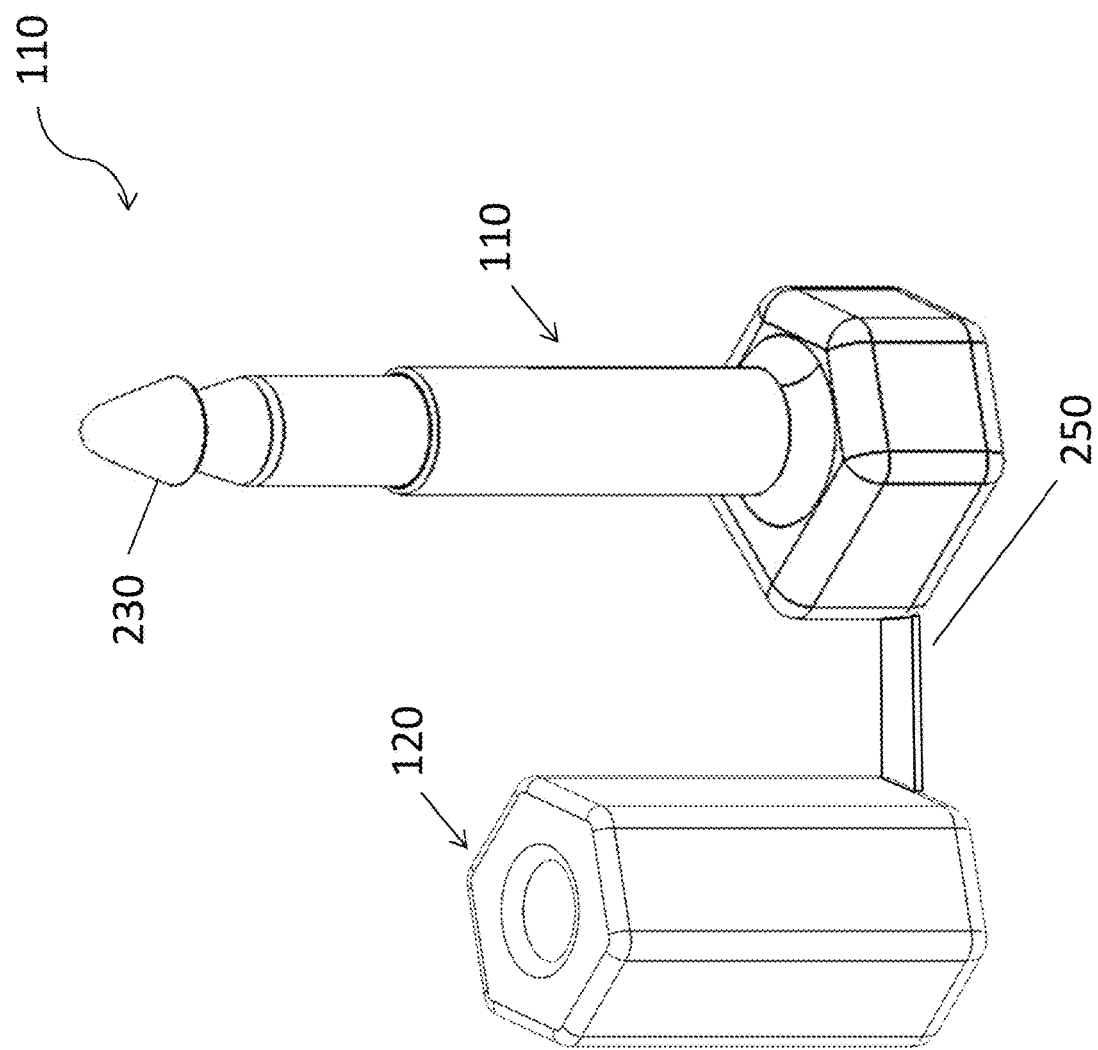
FIG. 9 shows a perspective view of a tracking device with a housing, a locking cap and a breakable attachment in accordance with another embodiment of the present invention.

In one preferred embodiment as depicted in FIG. 9, there is provided a tracking device 100 having an aforesaid housing 110 with a shoulder portion 190, an aforesaid locking cap 120, and an additional breakable attachment 250 connecting between the shoulder portion 190 and the locking cap 120. For instance, the breakable attachment 250 may include an electrical conduit therein, such that upon the user twists the locking cap 120 against the housing 110 or vice versa, a shear force would be applied onto the electrical conduit and this may break at least one of the electrical component of the electrical conduit. This ensures that the electrical circuit is damaged in an irreversible manner and provides a one-off wake-up function upon the breaking of the breakable attachment 250 is detected by the tracking device 100. Similarly, the locking cap 120 may also be designed to be worn, marked, or breakable each time it is inserted and removed from the housing. These example embodiments are advantageous in that the tracking device 100 can be designed to be "single use only", although the components can be recycled, by implementing the tracking device to being "single use only", the authenticity of the tracking device 100 can be assured by container users and thus increasing the security and peace of mind provided by the tracking device.

Although the breakable attachment 250 may be frangible and the tracking device 100 is intended for single use only, most of the electrical components of the tracking device 100 such as the housing 110 and locking cap 120 may be recycled and reused. To enable the reuse of the tracking device 100, in one example, the broken electrical conduit of the breakable attachment 250 is replaced by a new electrical conduit and the identity of the tracking device 100 is reset. As such, this tracking device 100 may deliver an environmental friendly solution whilst striking a fair balance with information security. In another example, only the electronics and electrical components are recycled, with the outer housing and locking cap being made from a low cost material such as plastic that can be readily made by a low cost process (e.g. molding) and readily suitable to receive the electronic components recycled from used tracking devices 100. Furthermore, each housing and locking cap can also be made with specific patterns or colors to represent a specific company or identity, and thus increasing the level of security and authenticity.

In one alternative example embodiment, the tracking device 100 may require a dual-actuation mechanism for safeguarding the tracking device 100 from accidentally actuated by a junior user. For instance, the tracking device 100 may require an initial breaking of the breakable attachment 250 and the subsequent insertion of the protruding tooth 230 into the locking cap 120. This prevent the mal-actuation of the tracking device 100 upon the protruding tooth 230 of one tracking device 100 is accidentally inserted into the locking cap 120 of the other tracking device 100' unintentionally.

In one example embodiment, the tracking device 100 may be operated in a battery saving mode when the communication gateway 140 of the tracking device 100 may not communicate with the receiver station 150. For instance, when the container is carried in a vessel at sea and there does not present any mobile network connectivity, the tracking device 100 may automatically enter sea-mode for battery saving. In the absence of mobile network connectivity, the tracking device 100 may rely on the mobile data of the vessel and communicate with the receiver station 150 via the satellite.

In one example embodiment, the tracking device 100 may put itself into sleep mode or turn itself off during shipping or certain extent of idling. For instance, if the aforesaid movement sensor 160 does not detect any movement for a certain period, it may signal the processor 170 to turn off the tracking device 100 or to put the tracking device 100 in sleep mode. The same functionality might be achieved by turning off or putting the tracking device 100 into sleep mode manually by other electrical or mechanical means.

In one alternative example embodiments, one or more of the location module 130, the communication gateway 140, the movement sensor 160, the processor 170, and the telecommunication tool 180 may be selectively housed in either the housing 110 or the locking cap 120. It may also be possible to place the processor 170 internally within the housing 110 or the locking cap 120 or alternatively, external to the tracking device 100 for handling the data processing remotely on the server end.

Figure 10:
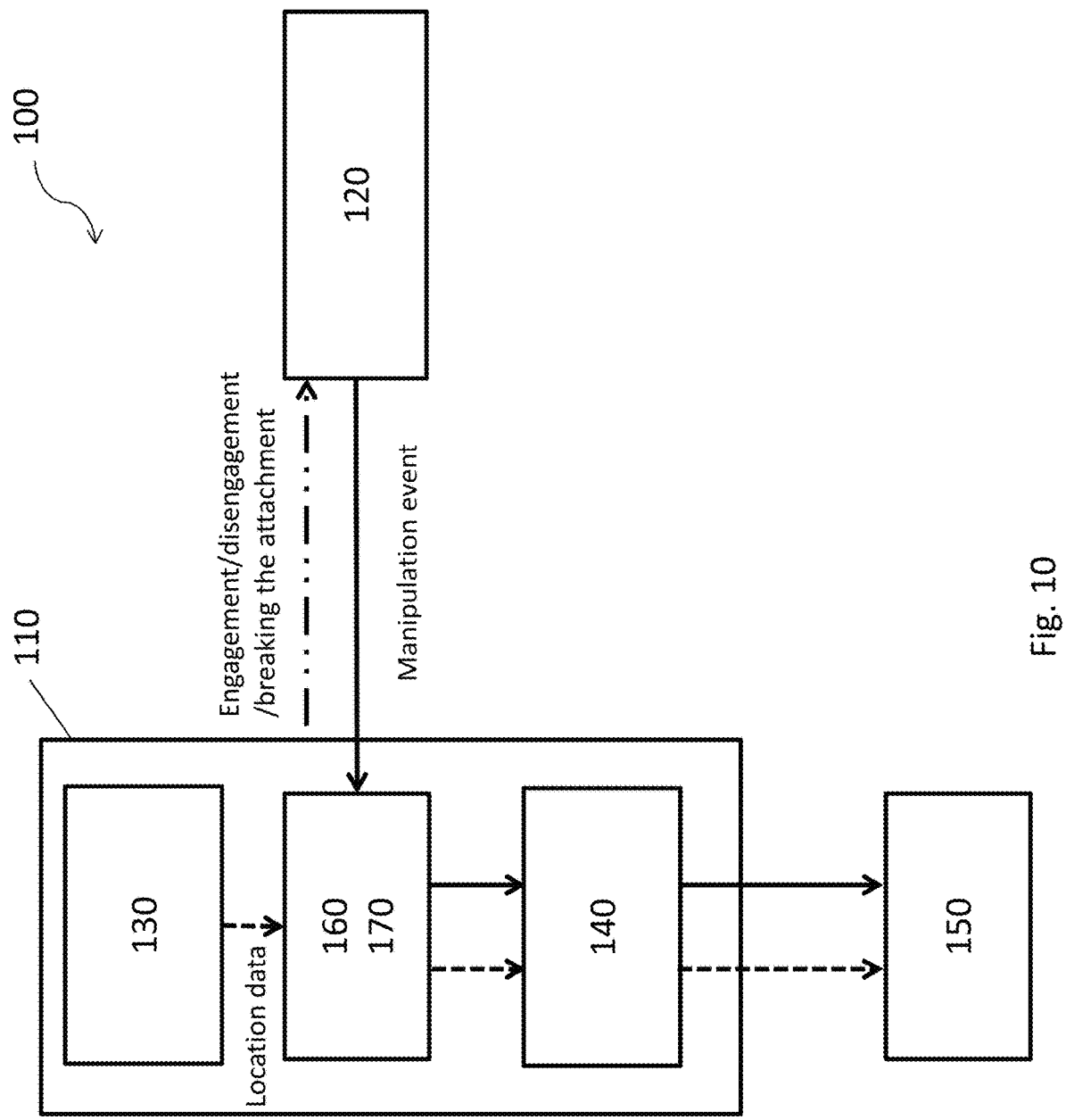
FIG. 10 shows a block diagram illustrating the interaction between components of the tracking device of FIG. 1 and a remote receiver station.

FIG. 10 illustrates the workflow of operating the aforesaid tracking device 100. The tracking device 100 involves the interaction between at least three or more entities including the housing 110, the locking cap 120, and the receiver station 150.

Initially, when the attachment 250 between the housing 110 and the locking cap 120 is disconnected, an electrical conduit would then actuate a circuit to generate a wake up signal to the location module 130, the communication gateway 140 and/or the processor 170.

For example, a tracking device 100 is in sleep mode or is turned off prior use. When a user would like to seal a container with the tracking device 100, the user has to break the physical connection conjoining the housing 110 and locking cap 120. At this moment, the tracking device 100 will be put on wake-up mode and a mechanical or electronic signal would be sent to notify the user that the tracking device 100 is ready for use.

When the housing 110 is engaged with an access mechanism of a container (e.g. a handle, lever etc.), the housing 110 is manipulated. This would be sensed by the movement sensor 160 such as gyro sensor and it will signal the processor 170. The processor 170 would record the manipulation event. Furthermore, the processor 170 would pick up and process the concurrent location data from the location module 130 at the time of the manipulation. These data would then be passed to the receiver station 150 through the communication gateway 140. An electronic and/or mechanical signal would be given out to confirm the user that the data is sent to the receiver station 150.

Upon engaging or disengaging the housing 110 and the locking cap 120, the processor 170 is arranged to detect and record the engagement or the disengagement event. Furthermore, the processor 170 would pick up and process the concurrent location data from the location module 130 at the time of the manipulation. These data would then be passed to the receiver station 150 through the communication gateway 140. An electronic and/or mechanical signal would be given out to confirm the user that the data is sent to the receiver station 150.

For example, when a user inserts the housing 110 through a locking aperture of a container into the receiving slot 210 of the locking cap 120, data combining the location and manipulation event would be sent to the receiver station 150. At the point, the user would also receive a notice from either the tracking device 100 or remotely from the receiver station 150 as a confirmation.

In the event of unauthorized or illegally unsealing the tracking device and container, the consignor or an authorized party who is in control of the receiver station 150 would immediately pick up the location where the container is opened. With this functionality, the consignor or other authorized parties could then immediately take responsive action to forestall further loss or legal liability.

In one alternative embodiment, there may also include one or more sensors for communicating the tracking device 100 with other external devices. For instance, the tracking device 100 may include one or more radio frequency (RF) sensors for detecting the presence of radio frequencies of any objects proximate to the tracking device 100 e.g. relevant ports and locations. For instance, the tracking device 100 may also include one or more Internet-of-Thing (IOT) sensors such as Gyroscope, magnetometer for motion detecting purposes such as movement associated with the tracking device 100 or any other nearby or proximate objects.

To monitor the environmental condition of the tracking device 100, there may also include one or more environmental sensors such as Gyro, moisture, humidity, air quality, temperature, VOC sensors. In any case, any undesirable conditions of the container 10 may be readily detected by the tracking device 100 and reported to the receiver station 150 for immediate actions. For instance, if the container 10 has been rocked side to side heavily, dropped or soaked in water or spread with toxic substances, the tracking device 100 may inform receiver station 150 immediately such that the operator may inspect the container 10 and take necessary actions.

In shipping events, most of the goods are covered under insurance plans. If the goods stored in the container 10 are inevitably damaged or contaminated, or in worst scenario, such damages cause a total lost to the proprietor, one or more output of these sensors may be collected and transmitted to the receiver station 150 for further data analysis. For instance, the insurer may refer to the data generated by these environmental sensors and make an informed decision, on the basis of the occurrence of unforeseen or unauthorised events, whether insurance claims should be granted to the insured for recovering or at least partially remedying his loss.

Upon the ship 30 has arrived a port to dock for a predetermined period, the shipping company is required to pay for a significant amount of port fees and storage fees. In most scenarios, the port fee may not be a fixed lump sum and it is basically calculated on a time basis. However, in the past, such port fee may only be roughly estimated by the shipping company and the uncertainty of the billed port fee may somewhat surprises the payer. With the provision of such tracking device 100, the arrival time of the container ship 30 and the departure time of the container ship 30 for next shipping event may be recorded individually and thus the duration therebetween may be used for determining an accurate docking period of the container ship 30. This may increase the transparency of the port and storage fees charged by the port operator and thus avoid any unnecessary quarrels between all the concerned parties.

Figure 11:
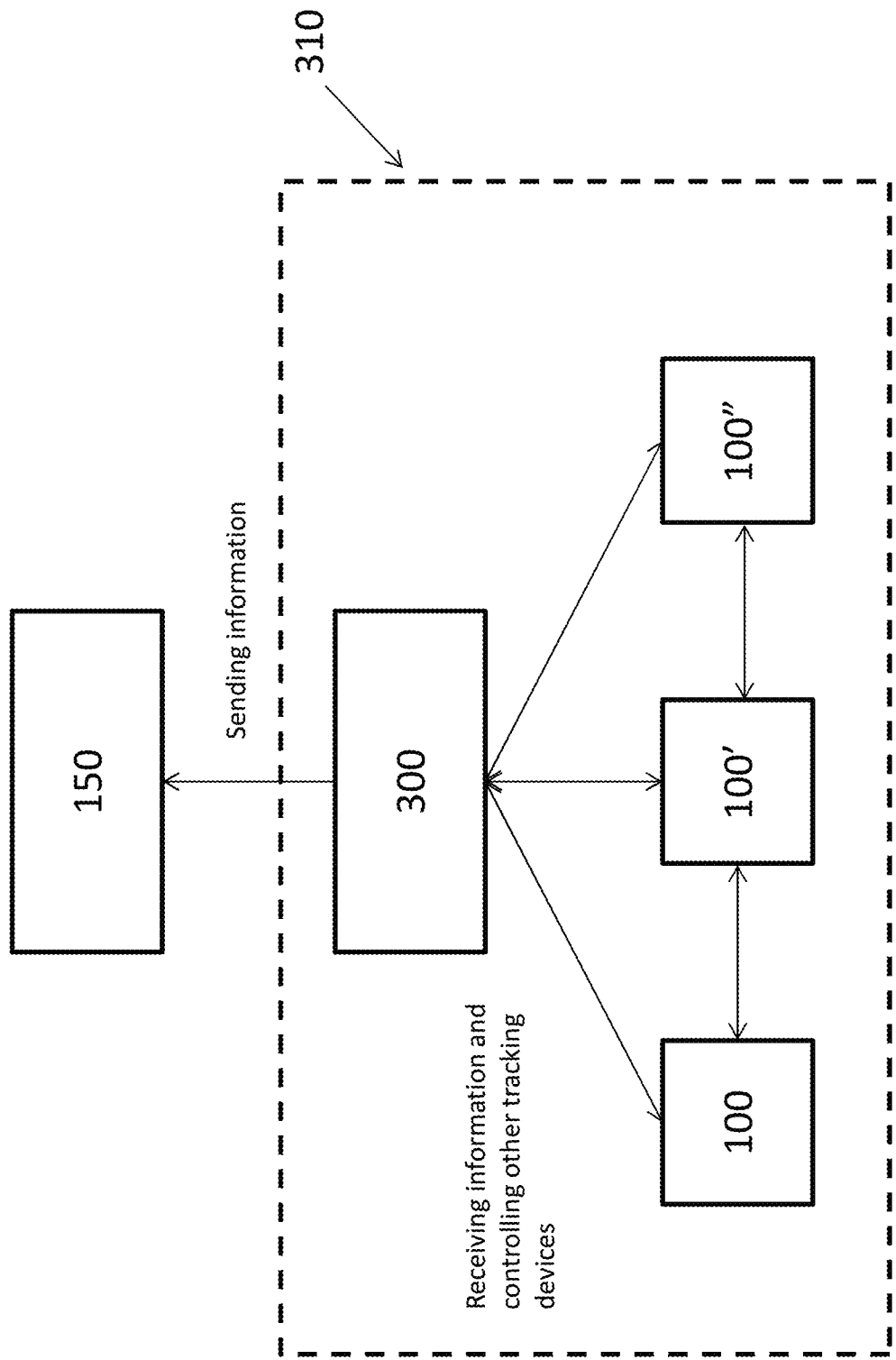
FIG. 11 shows a block diagram illustrating the method of communication between multiple tracking devices and remote receiver station through a master device.

Referring finally to FIG. 11, an aforesaid tracking device 100 can also be used in conjunction with other identical tracking devices 100', 100" in vicinity through the control of a master device 300 in an information sharing network 310. This master device 300 could be either one of the tracking devices 100 in use, another separate device built in or onto a tracking device 100, or another separate device built separate to tracking device 100 which may also carry a function of remote control.

The master device 300 may control and receive information from other tracking devices 100 nearby. For example, when multiple tracking devices 100 are used, the user is required to operate on one single master device 300 to deliver command to other tracking devices 100 belonged to the same information sharing network 310. This could essentially reduce the redundant manual work, operating on and delivering the same command on multiple tracking devices 100.

The advantage thereof is that, the user is only required to control one single device which is the master device 300 rather than multiple tracking devices 100. Furthermore, it could potentially reduce the communication traffic between a receiver station 150 and the numerous tracking devices 100 used since the receiver station 150 is only communicating with one single master device 300.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A tracking device comprising
   a location module arranged to determine a location of the tracking device;
   a communication gateway arranged to communicate the location of the tracking device to a receiver station; and
   a housing arranged to house the location module and the communication gateway, wherein the housing is further arranged to engage with an access mechanism such that when the access mechanism is actuated, the housing is manipulated, the manipulation is detected and recorded by a processor as a manipulation event.

2. The tracking device in accordance with claim 1, wherein the manipulation event is processed to include the location of the tracking device at the time of the manipulation.

3. The tracking device in accordance with claim 1, wherein the manipulation event is communicated to the receiver station via the communication gateway.

4. The tracking device in accordance with claim 1, wherein the location of the tracking device communicated to the receiver station is compared with a user predetermined location of the tracking device for validating the manipulation of the housing.

5. The tracking device in accordance with claim 1, further including an antenna module through which the location module determines the location of the tracking device with respect to a GPS source.

6. The tracking device in accordance with claim 1, wherein the damages to the breakable attachment between the housing and the locking cap by a breaking act to the breakable attachment is irreversible.

7. The tracking device in accordance with claim 1, wherein the previous location of the tracking device and the previous manipulation event of the housing associated with an aforesaid access mechanism is erased from the tracking device prior to engaging the housing with another access mechanism.

8. The tracking device in accordance with claim 1, wherein individual data associated with the location of the tracking device and the manipulation event of the housing is capsulated in a blockchain, whereby the new data associated with the new location of the tracking device and the new manipulation event is stored within the blockchain.

9. A tracking device comprising
   a location module arranged to determine a location of the tracking device;
   a communication gateway arranged to communicate the location of the tracking device to a receiver station; and
   a housing arranged to house the location module and the communication gateway, wherein the housing is further arranged to engage with an access mechanism such that when the access mechanism is actuated, the housing is manipulated, wherein the housing is elongated and is arranged to engage with an access mechanism by insertion into a locking aperture of the access mechanism.

10. The tracking device in accordance with claim 9, wherein the housing includes a shoulder portion arranged to abut the locking aperture so as to retain the housing in the locking aperture.

11. The tracking device in accordance with claim 10, wherein the housing further includes a locking cap arranged to engage with a distal end of the shoulder portion so as to secure the housing in the locking aperture.

12. The tracking device in accordance with claim 11, wherein the locking cap includes a receiving slot arranged to receive and engage to a protruding tooth on the housing.

13. The tracking device in accordance with claim 12, wherein when the locking cap is engaged or disengaged from the housing, the processor is arranged to detect the engagement and disengagement of the locking cap.

14. The tracking device in accordance with claim 13, wherein the engagement and disengagement of the locking cap is stored and processed as an engagement and disengagement event.

15. The tracking device in accordance with claim 14, wherein the engagement and disengagement event is processed to include the location of the tracking device at the time of the engagement or disengagement.

16. The tracking device in accordance with claim 15, wherein the locking cap is attached to the housing before use and is arranged to be detached from the housing by a user to engage with the distal end of the shoulder portion for use of the tracking device.

17. The tracking device in accordance with claim 16, wherein the locking cap is integrally formed as part of the housing and includes a breakable attachment arranged to attach the cap to the housing.

18. The tracking device in accordance with claim 17, wherein when the breakable attachment is broken, a wake up signal arranged to switch on the processor, communicate gateway or location module is generated.

19. The tracking device in accordance with claim 18, wherein the breakable attachment includes an electrical conduit arranged to actuate a circuit to generate the wake up signal when the electrical conduit is manipulated when the breakable attachment is broken.

20. The tracking device in accordance with claim 12, wherein the housing includes an elongated portion and the elongated portion in use is at least partially inserted into the locking cap.

21. The tracking device in accordance with claim 20, wherein the shoulder portion is arranged to engage with the elongated portion.

22. The tracking device in accordance with claim 21, wherein the shoulder portion is fastened to the elongated portion.

23. The tracking device in accordance with claim 22, wherein the elongated portion includes an elongated fastener for locking the shoulder portion to the elongated portion.

24. The tracking device in accordance with claim 23, wherein the shoulder portion is removable from the housing upon the upper and lower portions of the elongated portion are separated into two pieces.

25. The tracking device in accordance with claim 24, wherein the elongated portion further includes a circuited wire for generating a signal indicating a separation of the upper and lower portions.

26. A tracking device comprising
   a location module arranged to determine a location of the tracking device;
   a communication gateway arranged to communicate the location of the tracking device to a receiver station; and
   a housing arranged to house the location module and the communication gateway, wherein the housing is further arranged to engage with an access mechanism such that when the access mechanism is actuated, the housing is manipulated, wherein the tracking device is arranged to communicate with one or more adjacent tracking devices for forming a data exchanging network whereby data received by one tracking device from a data source is communicated to other tracking devices via the data exchanging network.

* * * * *